Figure 4:
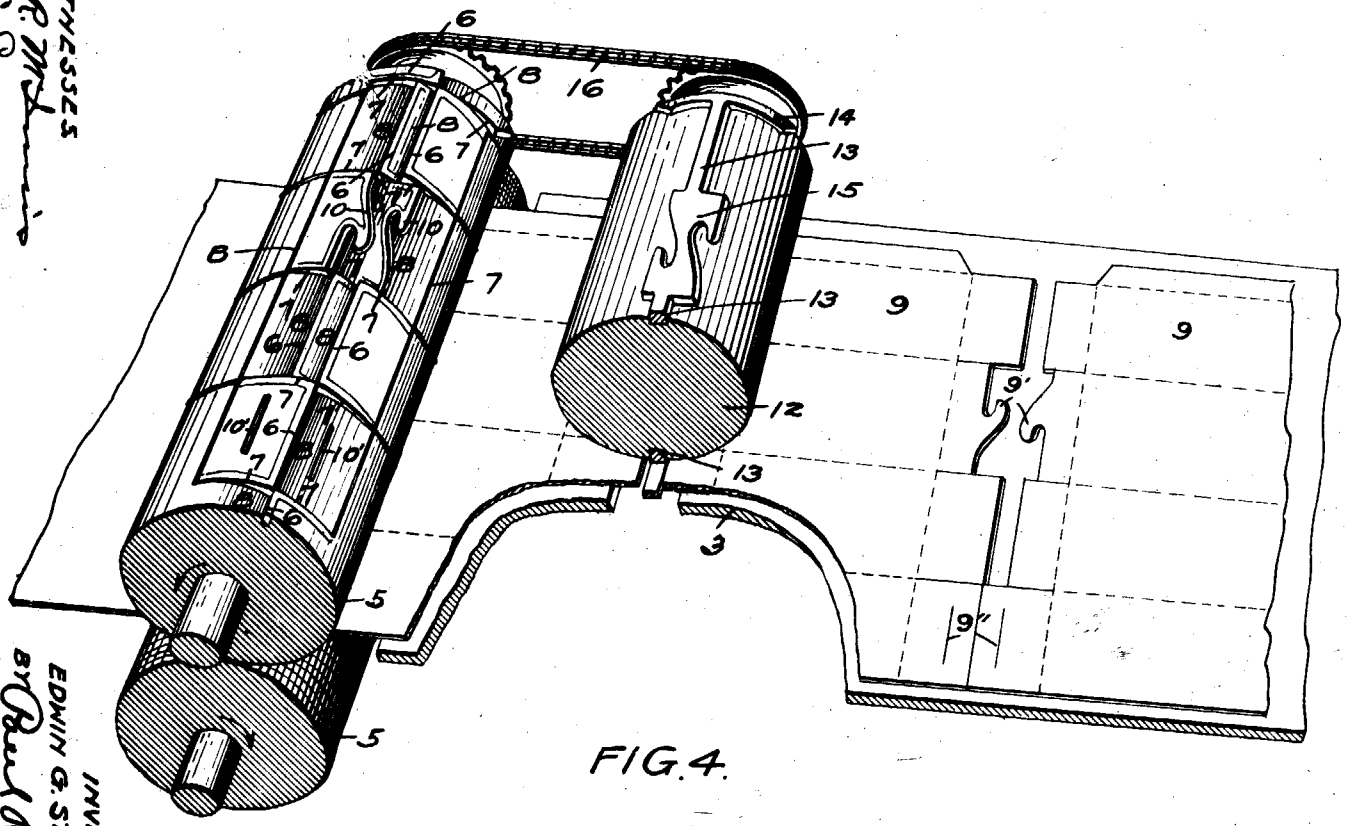

E. G. STAUDE.
MACHINE FOR MAKING FLEXIBLE BOXES.
APPLICATION FILED APR. 27, 1911.
Reissued June 22, 1915.
13,937.
2 SHEETS—SHEET 1.
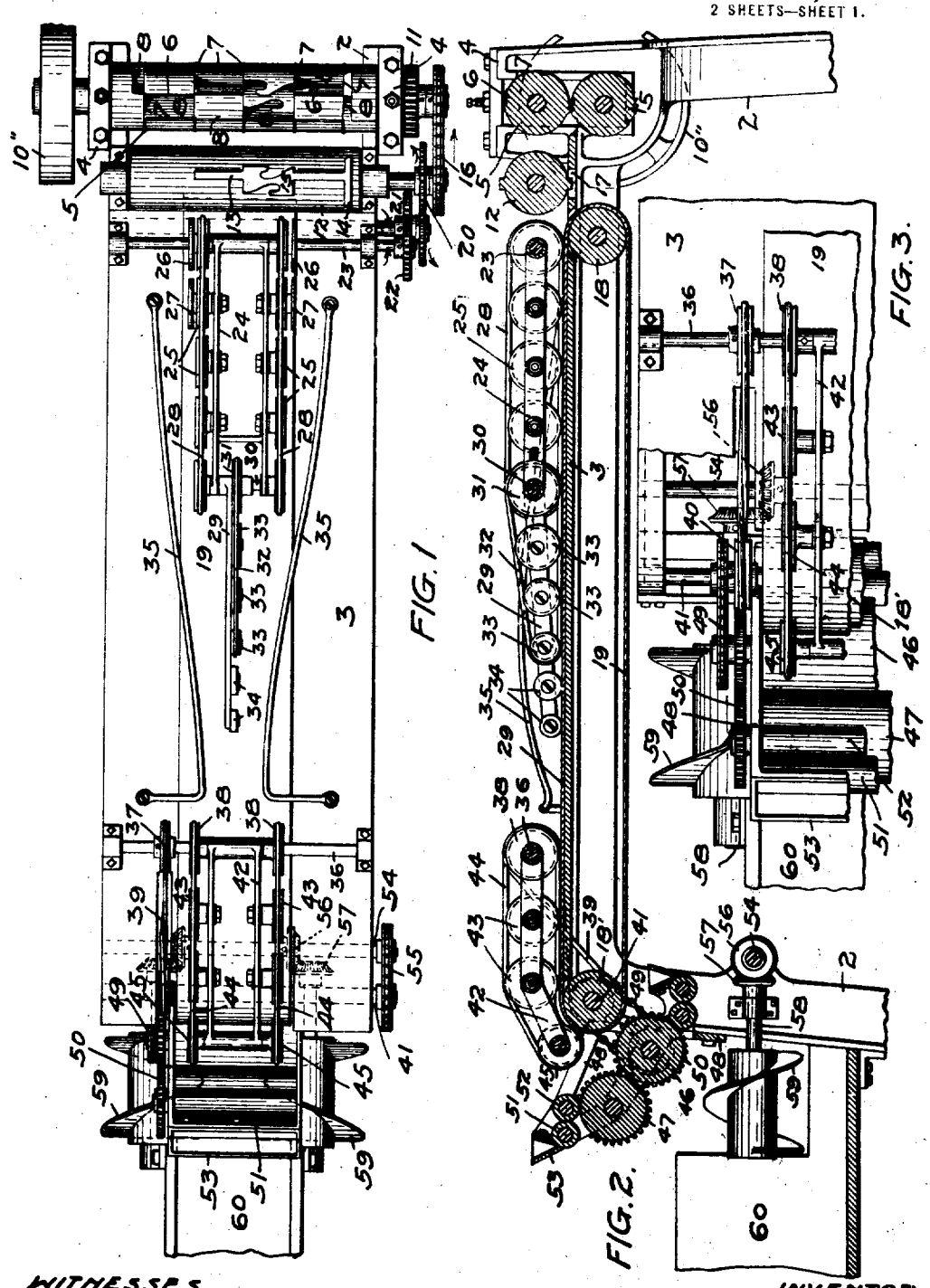
WITNESSES
M. R. McInnis
S. E. Sorensen
INVENTOR
EDWIN G. STAUDE
BY Paul & Paul
HIS ATTORNEYS

E. G. STAUDE.

MACHINE FOR MAKING FLEXIBLE BOXES.

APPLICATION FILED APR. 27, 1911.

Reissued June 22, 1915.

13,937.

2 SHEETS—SHEET 2.

WITNESSES

M. R. McInnis

S. E. Sorensen

INVENTOR

EDWIN G. STAUDE

BY Paul & Paul

HIS ATTORNEYS

UNITED STATES PATENT OFFICE.

EDWIN GUSTAVE STAUDE, OF MINNEAPOLIS, MINNESOTA, ASSIGNOR TO E. G. STAUDE MANUFACTURING COMPANY, A CORPORATION OF MINNESOTA.

MACHINE FOR MAKING FLEXIBLE BOXES.

13,937. Specification of Reissued Letters Patent. Reissued June 22, 1915.

Original No. 948,710, dated February 8, 1910, Serial No. 143,179. Application for reissue filed April 27, 1911. Serial No. 623,791.

*To all whom it may concern:*

Be it known that I, EDWIN G. STAUDE, of Minneapolis, county of Hennepin, State of Minnesota, have invented certain new and useful Improvements in Machines for Making Flexible Boxes, of which the following is a specification.

My invention relates to machines for making flexible boxes and particularly those designed for containing cereal foods.

The object of the invention is to improve the apparatus shown and described in certain Letters Patent of the United States issued to me on the 9th day of December, 1902, No. 715,620.

The invention consists generally in providing means for separating the waste pieces that are cut out by the action of the knives from the finished blanks.

Further, the invention consists in improved means for holding the blanks firmly upon a traveling belt during the pasting and folding operation, and, Further, the invention consists in means for placing suitable printed matter upon the blanks, and, Further, the invention consists in various constructions and combinations, all as hereinafter described and particularly pointed out in the claims.

In the accompanying drawings forming part of this specification, Figure 1 is a plan view of a box-making machine embodying my invention, Fig. 2 is a longitudinal section, Fig. 3 is a plan view of a portion of the discharge end of the machine, showing the mechanism for operating the printing rolls and the devices for holding the blanks upon the belt at that point, Fig. 4 is a perspective showing the cutting rolls and the means employed for detaching the waste portions from the blanks.

In the drawings, 2 represents a suitable frame whereon a table 3 is arranged. Near the receiving end of said table, said frame is provided with standards 4, between which the cutting and scoring rolls 5 are mounted. These rolls are provided on their peripheries with scoring or cutting knives 6 and groups of severing and transverse cutting or slitting knives 7 and 8, that fit snugly within sockets in said peripheries, the severing knives extending lengthwise of the rolls, and the slitting knives substantially at right angles with the severing knives and conforming to the rounded surfaces of the rolls. These knives are substantially the same as those shown and described in my Patent No. 837,353, dated December 4, 1906, and hence need no detailed illustration or description herein.

The cutting rolls in this machine are designed particularly for turning out blanks 9 having tongues 9′ at the ends of the cartons that are adapted to enter slits 9″ in the opposite flap and interlock to prevent accidental opening, and said rolls are therefore provided with irregularly shaped cutting knives 10 for forming the said tongues, and straight knives 10′ for cutting the slits 9″. The shaft of the lower roll is provided with a driven pulley 10″ and both of said shafts have gears 11 that mesh with each other and are of the same size, to cause the rolls to be driven at the same peripheral speed. In front of the cutting rolls I provide a roll 12, mounted in bearings in the frame of the machine and provided on its periphery with longitudinally arranged ribs 13 and with a transverse rib 14 and a raised irregular portion or projection 15 that corresponds in its outline to the shape of the knives 10. The roll 12 is driven from the shaft of the upper roll 5 by means of a sprocket chain 16, and has the same peripheral speed as said cutting rolls. I prefer to provide the roll 12 with two sets of the ribs 13 and 14 and the raised portion 15, and these parts are arranged to engage and press or push the waste pieces of the blanks out from between their abutting ends, as the blanks pass between the roll 12 and the table. Beneath the roll 12 I prefer to provide a slot 17 in the table through which the said waste pieces are discharged. In this machine the roll 12 will pass over two blanks with each revolution, but it may be arranged, of course, in the manufacture of longer cartons, to pass over but one blank, and in that event it would be provided with but one set of the ribs and the raised portion. At each end of the table 3 I provide rolls 18 and 18′, over which a belt 19 is adapted to travel, its upper half resting upon the surface of the table. The roll 18 is driven from the shaft of the roll 12 by a gear 20. A gear 21 is secured on the shaft of the roll 18 and meshes with a similar gear 22 on a shaft 23 that is mounted in bearings on the table near its revolving end. All these parts operate at the same speed, so that the blanks will pass through the machine at a uniform speed, and the maximum capacity of the machine can be maintained.

A frame 24 is mounted on the shaft 23 and carries a series of idle wheels 25 that are arranged above the surface of the blanks, and upon each side of said frame on said shaft, I arrange wheels 26 secured thereon and adapted to bear toward the blanks near the edge of the traveling belt, to prevent any possibility of the blanks curling up as they leave the rolls. I also prefer to provide idle wheels 27 in advance and in line with the wheels 26. The idle wheels 25 on each side of the frame are driven by means of belts 28, which connect them with the wheels 26, and which belts coöperate with the belt 19 in feeding or carrying the blanks forward. The forward end of the frame is provided with a pivoted arm 29 mounted on a shaft 30, on the ends of which the idle wheels 25, at that point, are supported, and said shaft is provided with a wheel 31 over which and a series of idle wheels 33 a belt 32 passes, said wheels 33 being mounted on the arm 29 and gradually decreasing in size toward its free end. The forward end of the arm 29 is provided with several idle wheels 34. The weight of the frame 24, the arm 29, and the wheels carried by said frame and arm will hold the blanks down upon the belt with a yielding pressure and prevent their slipping while the edges are being folded. I prefer to taper the arm 29 and provide idle wheels thereon that gradually decrease in diameter toward the free end of the arm, so that, as the edges or flaps of the blanks are folded over the middle or body portions thereof, and during such folding operation are carried along by the feeding belts, the wheels above the middle or body portions of the blanks will be inside of the flaps or folded portions and not interfere with the action of the folder arms 35. As in my patent above referred to, I prefer to extend the pivoted arm 29 to a point opposite to the termination of the inwardly turned portions of the folders, so that, during the folding operation, the blanks will be yieldingly held on the traveling belt, and the weight of the arm 29 and the wheels carried thereby will be sufficient to prevent any danger of slipping.

Upon the table near the discharge end of the machine I provide a shaft 36, whereon wheels 37 and 38 are secured, the former being connected by a belt 39 with a pulley 40 on the shaft 41 of the adjacent roll 18′. A frame 42 is mounted on the shaft 36 and is provided with a series of idle wheels 43, connected by belts 44 with the wheels 38, and said belts also pass over smaller idle wheels 45, provided at the forward end of said frame and below the level of the wheels 43. The belts 44 are pressed down on the blanks passing beneath them by the weight of the frame 42 and of the wheels 37, 38, 43 and 45, so that said belts will assist the belt 19 in carrying the blanks forward and will also serve to complete the folding operation by pressing down the flaps turned over by the folders 35. Rolls 46 and 47, having printing type on their peripheries, are supported in bearings at the discharge end of the machine in a suitable frame 48, and are arranged to receive the ends of the blanks as they are discharged from between the traveling belt and the idle wheels 45. The roll 46 is driven by a chain 49 from the shaft 41, and a gear 50 is provided on the shaft of the roll 46 meshing with a similar gear on the adjacent printing roll, and above the printing roll 47 are ink rolls 51 and 52, the latter being in engagement with the surface of the roll 47 and driven thereby. 53 is an ink reservior provided near the roll 52. A similar inking mechanism is provided near the roll 46. Beneath the discharge end of the machine is a transverse shaft 54 driven by a belt 55 from the shaft of the roll 18′, and beveled gears 56 are provided on the said shaft 54 meshing with similar gears 57 on the shaft 58, whereon spirals 59 are arranged. These spirals are above a trough 60, and the blanks discharged from between the printing rolls pass between the spirals and are advanced thereby into the trough and packed, one against another, in an upright position. Any suitable matter may be provided on the printing rolls, according to the size and shape of the cartons, it being essential, however, to regulate the speed of the same according to that of the belt and the other mechanism of the machine, so that the printing on the blanks will be uniform and regular.

The following is a brief description of the operation of my machine: The machine having been set in motion, the roll of paper is fed to the cutting and scoring rolls in the usual manner, and as the paper passes between the rolls, the coöperation of the knives thereon will slit and sever the blanks, as shown in Fig. 4. The knives will cut the stock to form the tongues in the ends of the flaps and also the slits, to receive said tongues when the ends of the cartons are closed. The waste strip between the blanks will be engaged and pressed through the slot 17 by the action of the roll 12, and the blanks passing from between said roll and the table, will be engaged by the endless belts 19, 28 and 32 and carried along the folders. After being folded, the blanks will be engaged by the belts 44 to complete the folding operation by pressing down or tightening the folded flaps, and, after passing through the printing rolls, will be delivered to the spiral conveyers and packed in the trough 60. It will, of course, be understood that the flaps of the blanks will be glued or pasted before being folded, as indicated in my Patent No. 715,620, hereinbefore referred to.

The machine is extremely simple of construction, quick in operation, and will turn out blanks that are uniform and regular, even when driven at a high rate of speed.

I claim as my invention:—

1. In a machine for making paper boxes, the combination with a suitable frame, of a table, a shaft near the receiving end of said table, means for driving said shaft, wheels secured on said shaft, a frame hinged on said shaft, a series of idle wheels carried by said frame, and belts passing over said shaft wheels and said idle wheels, substantially as described.

2. In a machine for making paper boxes, the combination of a table, a revolving shaft near the receiving end of said table, wheels secured on said shaft, a frame hinged on said shaft between said wheels, idle wheels carried by said frame, belts connecting said idle wheels and said shaft wheels, an arm pivoted on said frame, and a series of idle wheels carried by said arm.

3. In a machine for making paper boxes, the combination of a table, an endless belt operating over the same, a revolving shaft, wheels secured to said shaft, a frame hinged on said shaft, idle wheels carried by said frame, and belts connecting said idle wheels and said shaft wheels.

4. In a machine for making paper boxes, the combination of a table, an endless belt operating over the same, a revolving shaft, wheels 26 secured to said shaft, a frame hinged on said shaft between said wheels, idle wheels mounted in said frame, belts connecting said idle wheels, and wheels 27 in advance of and in line with said wheels 26.

5. In a machine for making paper boxes, the combination of a table, an endless belt operating over the same, a revolving shaft, a frame hinged thereon, idle wheels carried by said frame, an arm hinged on said frame, idle wheels carried by said arm, and folder arms provided on said table, upon each side of said frame.

6. In a machine for making paper boxes, the combination of a table, a belt operating over the same, a frame hinged above said table, idle wheels carried by said frame, an arm pivoted upon said frame, idle wheels carried by said arm and arranged above said belt near the middle thereof, and said wheels gradually decreasing in size toward the discharge end of said table.

7. In a box-making machine having a table and an endless belt operating over the same, a frame hinged above said belt near the discharge end of said table, and having its free end toward the discharge end of the table, a series of idle wheels carried by said frame, and belts connecting said wheels.

8. The combination, with a table, of an endless belt operating over the same, a revolving shaft provided near the discharge end of said table, wheels secured on said shaft, a frame hinged on said shaft, idle wheels carried by said frame and belts connecting said idle wheels and said shaft wheels, substantially as described.

9. In a box making machine having a table, an endless belt operating over the table, means for folding a box blank, and printing rolls located at the discharge end of said table and below the top thereof, gripping means located above said table and printing rolls at the discharge end thereof and having an overhanging part beyond the end of the table to direct a blank from the belt downwardly to the printing rolls, substantially as described.

10. In a box making machine having a table, an endless belt operating over the table, means for folding a box blank and printing rolls located at the discharge end of the table and below the top thereof, a frame above the discharge end of the table, and above the printing rolls, and a series of idle wheels mounted in said frame and cooperating with the belt to deliver blanks from the table to the printing rolls.

11. The combination, with means for folding a box blank, of means for printing on the folded blank, means for holding down the folded portions of the box blank while the latter is passing to the printing means, and means for delivering the blanks from said printing means to a receptacle.

12. In a box-making machine having a feed belt, and means for folding a box blank thereon, printing rolls located at the end of said feed belt, and means located above said belt for gripping the blanks and delivering them to said printing rolls, substantially as described.

13. The combination, with a suitable frame, of a belt mounted therein, a table over which said belt operates, folding devices arranged to engage blanks on said belt, means for pressing the edges of the blank together, and printing rolls to receive the blanks from said belt and said pressing means.

14. In a box making machine, an endless carrier for conveying the blanks while being folded, means above said carrier for folding a blank, pressing belts situated above said carrier at the discharge end of said folding means, for engaging a blank to complete its fold, pulleys or wheels over which said belts run, a shaft carrying one set of said pulleys or wheels, and means, independent of said belts, for driving said shaft to operate said belts.

15. In a paper-box making machine, the combination, with scoring and severing rolls, of a table to receive the blank from said rolls, said table having an opening therein adjacent to said rolls, for the discharge of the severed portion of the blank, and a roll above the table, said roll provided with a raised portion corresponding to the cut portion of the blank which is to be removed and arranged to be brought into register therewith and with the opening in the table, substantially as described.

16. In a box making machine, an endless carrier for conveying the blanks while being folded, means above said carrier for folding a blank, pressing belts situated above said carrier, at the discharge end of said folding means, for engaging a blank to complete its fold, pulleys or wheels over which said belts run, suitable mountings for said pulleys or wheels, and means for driving said pulleys or wheels to operate said belts.

17. In a machine for making paper boxes, the combination, with a lower endless carrier belt, of an upper coöperating endless carrier belt, a series of wheels engaging the lower stretch of the said upper carrier belt, a frame in which said wheels are journaled so that said wheels will be adapted to move up and down with said frame, whereby said lower stretch of said upper carrier belt will be pressed toward the upper stretch of the lower carrier belt by the weight of said wheels and frame, means for driving said carrier belts, means for folding the flaps of a blank over onto the body portion thereof, one or more pressing belts beyond the folding means, and a yielding pressing device beyond the said upper carrier belt to hold down the blanks while being folded.

18. In a machine for making paper boxes, the combination with a lower endless carrier belt, of upper coöperating endless carrier belts, a series of wheels engaging the lower stretches of the said upper carrier belts, a frame in which said wheels are journaled so that said wheels will be adapted to move up and down with said frame, whereby said lower stretches of said upper carrier belts will be pressed toward the upper stretch of the lower carrier belt by the weight of said wheels and frame, means for driving said carrier belts, means for folding the flaps of a blank over onto the body portion thereof, one or more pressing belts beyond the folding means, and a yielding pressing device beyond the said upper carrier belts to hold down the blanks while being folded.

19. In a machine for making paper boxes, the combination, with a lower carrier comprising a lower belt having an upper horizontal stretch to engage the blanks, of an upper carrier comprising wheels and belts serving to press the blanks against said lower carrier, a frame in which the wheels of said upper carrier are journaled so that the weight of said frame, as also of said wheels, will be utilized to hold the blanks down, means for operating said carriers, flap-folding devices, a pressing device beyond the folding devices and comprising wheels and belts for tightening down the folded flaps, and a yielding pressing device beyond said upper carrier and serving to hold down the blanks while being folded.

In witness whereof, I have hereunto set my hand this 13th day of April, 1911.

EDWIN GUSTAVE STAUDE.

In presence of—
GENEVIEVE E. SORENSEN,
EDWARD A. PAUL.